March 15, 1955     D. SAMIRAN     2,704,117
COMBINED FUEL FEEDING AND FUEL SERVICING SYSTEM FOR AIRCRAFT
Filed Dec. 17, 1948     6 Sheets-Sheet 1

INVENTOR
DAVID SAMIRAN
BY Wade Kovity
and
Frederick W. Cotterman
ATTORNEYS

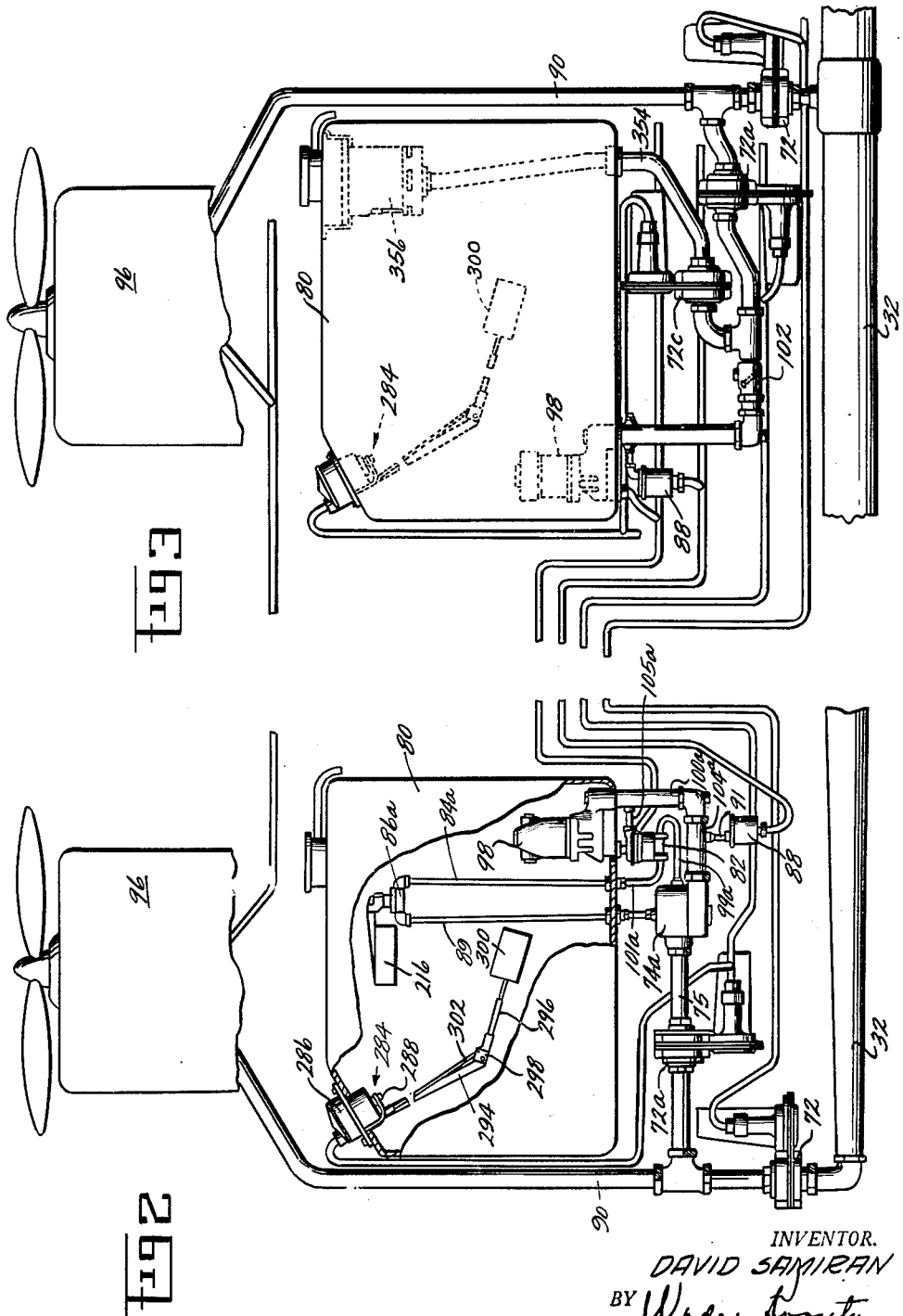

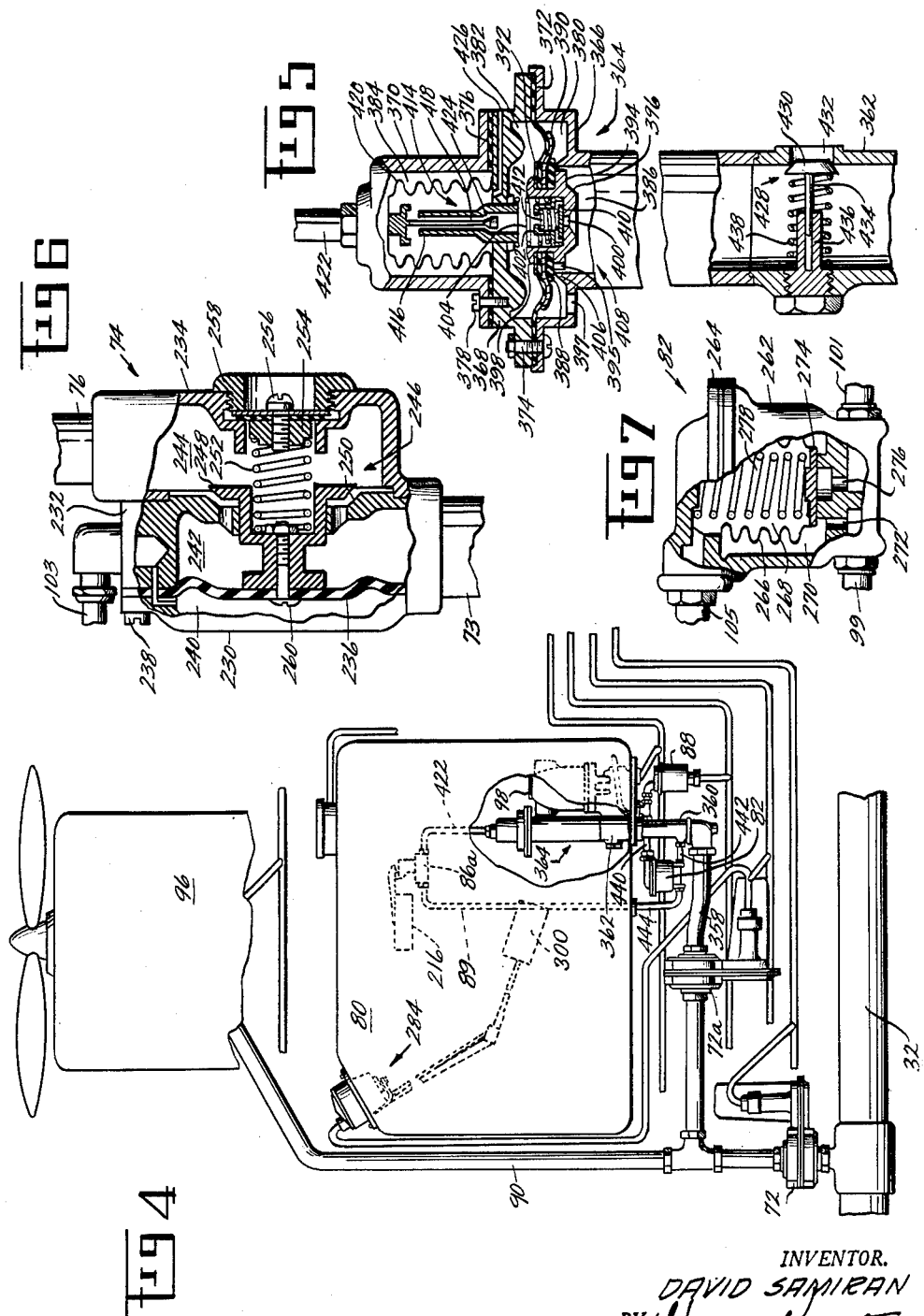

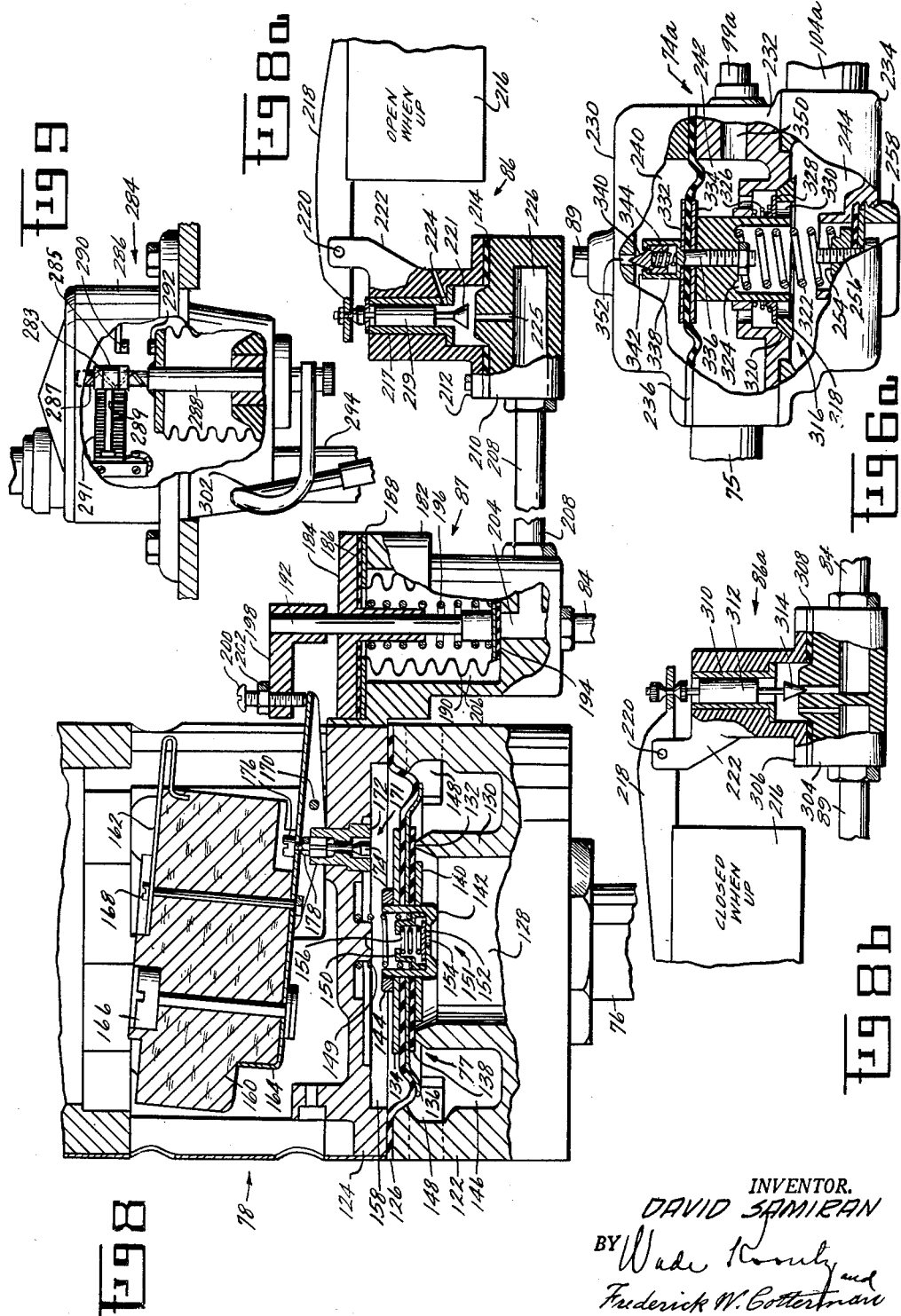

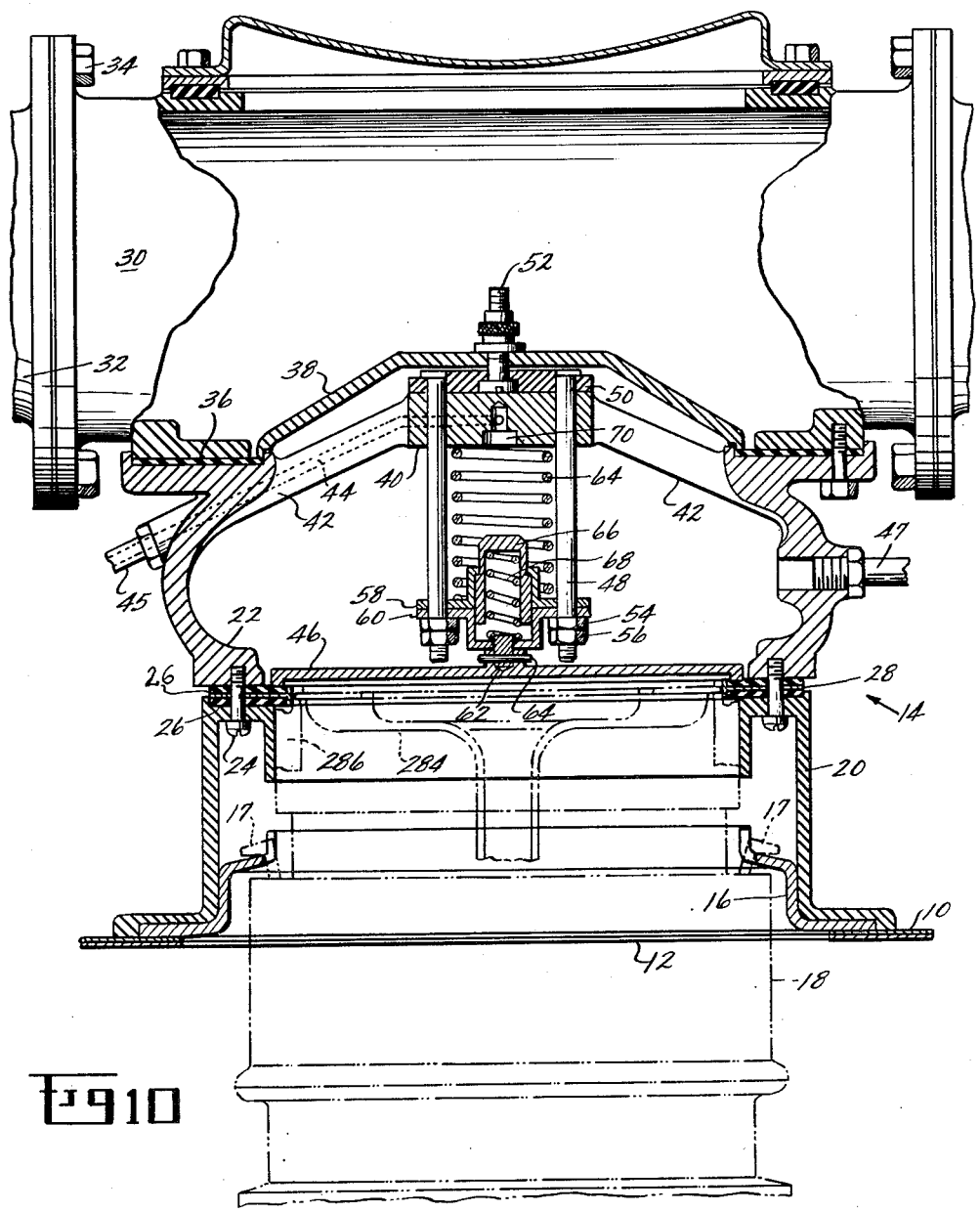

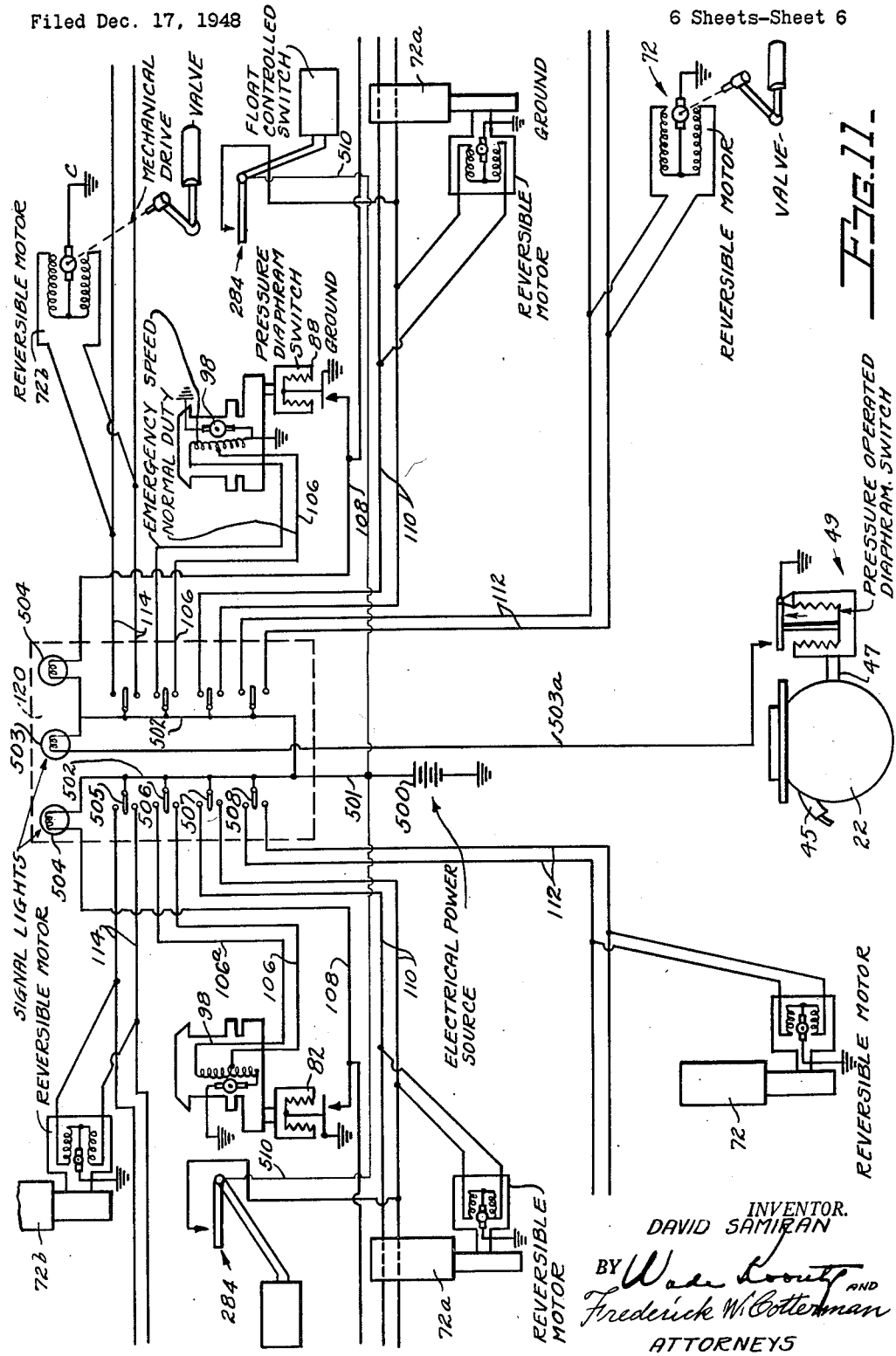

United States Patent Office 2,704,117
Patented Mar. 15, 1955

2,704,117

COMBINED FUEL FEEDING AND FUEL SERVICING SYSTEM FOR AIRCRAFT

David Samiran, Dayton, Ohio

Application December 17, 1948, Serial No. 65,952

24 Claims. (Cl. 158—36.4)

(Granted under Title 35, U. S. Code (1952), sec. 266)

The invention described herein may be manufactured and used by or for the Government for governmental purposes without payment to me of any royalty thereon.

This invention is a continuation in part of my copending application Serial No. 30,713, filed June 2, 1948, now Patent No. 2,556,221, issued June 12, 1951, and relates to a combined fuel feeding and fuel servicing system for aircraft and is particularly related to multi-engine and multi-tank aircraft.

An object of the invention is to provide a fuel system wherein there is a single fuel intake fitting to which the nozzle from a fuel supply source may be quickly attached or detached, said fitting being permanently supported at a convenient place in the skin of an aircraft, and arranged to communicate with a manifold within the aircraft from which all engines of the craft may draw fuel and through which all tanks of the craft may be refueled.

Another object is to provide separate means associated with each tank whereby a tank will be automatically shut off from further fuel intake when it becomes filled to a predetermined level regardless of the size of the tank or the time required to fill it.

Due to the relatively frail construction of the tanks in a fuel feeding and fuel servicing system of the character herein shown, it may be desirable to provide duplex shut-off means in each of the tanks of the system whereby, when either means fails to function, the other may be made to carry the duties that normally are carried by both, and it is therefore another object to provide both a primary and a secondary shut-off means in each of the several exemplifications shown.

Another object is to provide means whereby, when the tanks have all become filled and the flow from the source of supply is interrupted, and the service nozzle is detached, the single act of detaching the service nozzle from the fuel intake fitting will automatically close the intake opening of the fitting against fuel return flow and will open a vent passageway extending from the inside of the fuel intake fitting to the space above the fuel in the tank.

In the system herein disclosed there are a number of electrically actuable instrumentalities which are selectively controllable by the operator, and it is a further object of the invention to assemble the switches for controlling these instrumentalities on a centrally located switchboard conveniently placed within the operator's reach.

Other objects and advantages will become evident as the invention is further described and reference is made to the drawing, wherein:

Figs. 2, 3 and 4 are somewhat schematic views of several variants of the invention wherein the valves and other instrumentalities are modified and rearranged.

Fig. 5 is a sectional view of a fuel control valve, this instrumentality being employed as a primary shut-off means in the modification shown in Fig. 4.

Fig. 6 is a central cross section through a flow control valve, this device being employed as a secondary shut-off means in the modification shown in Fig. 1.

Fig. 6a is a central cross section through a flow control valve employed as a primary shut-off means in the modification Fig. 2.

Fig. 7 is an axial section through a pressure control valve, this device being employed in the modifications shown in Figs. 1, 2 and 4 to compel opening of the hydraulically operable shut-off means at a predetermined pressure.

Fig. 8 is a central cross section through a fuel level control valve as used for a primary shut-off means in the exemplification shown in Fig. 1.

Fig. 8a is a central cross section through a flow level control valve as used in conjunction with the primary shut-off means in the exemplification Fig. 1.

Fig. 8b shows a flow level control valve especially adapted to the modifications Figs. 2 and 4 and used in conjunction with the primary shut-off means.

Fig. 9 is a cross section through a quantity gauge and control switch, this device being used as a part of the secondary shut-off means in the modifications shown in Figs. 2, 3 and 4.

Fig. 10 is a fragmentary view of a fuel intake fitting which is attached to the manifold and is adapted to receive and have clamped thereto a fuel servicing nozzle.

Fig. 11 is a schematic wiring diagram of a multi-engined fuel system in accordance with the embodiment disclosed in Fig. 2 but illustrating the details of the electrical system generally applicable to the invention.

Like reference characters refer to like parts throughout the several views.

Figure 1:
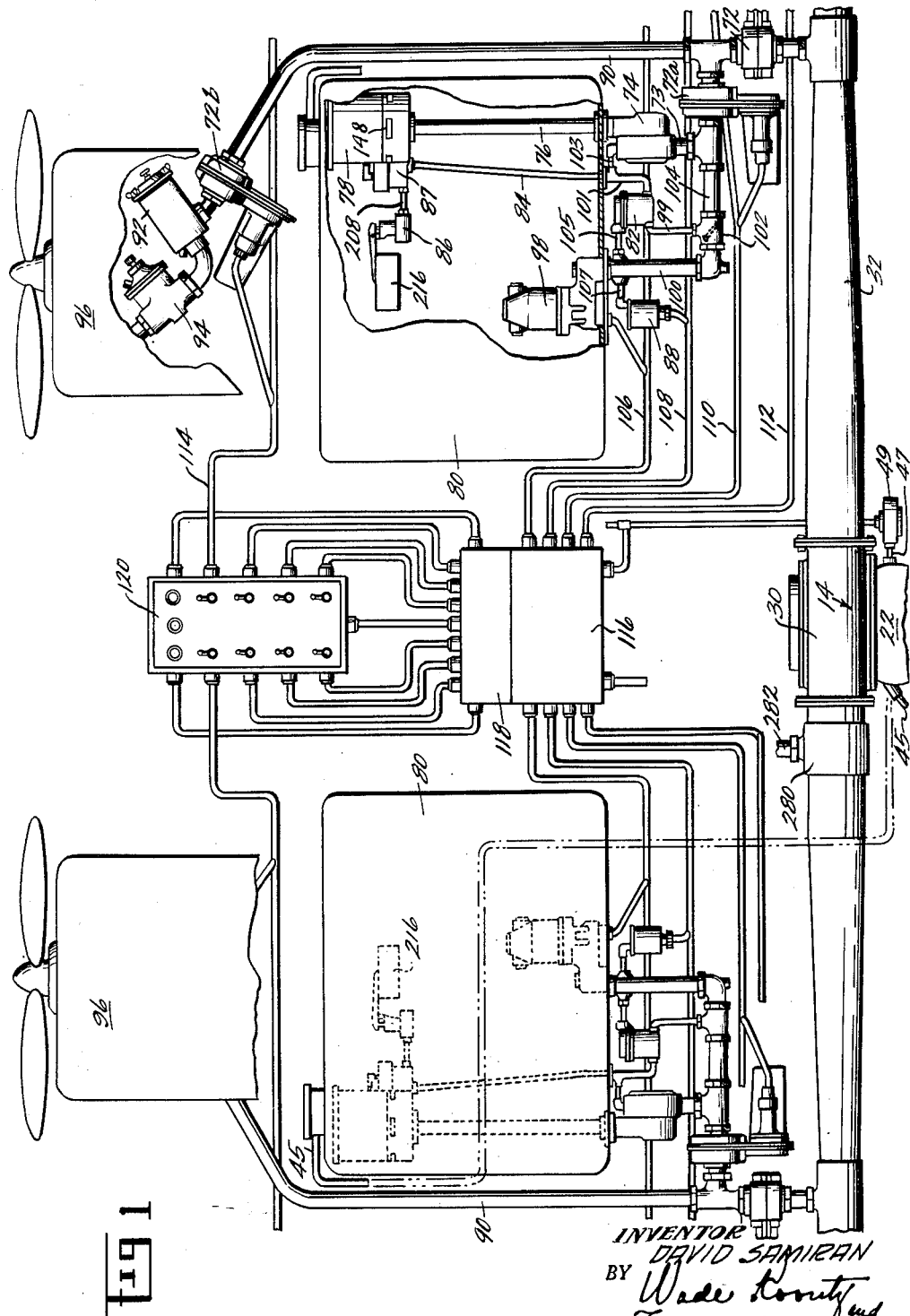
Fig. 1 is a somewhat schematic view of a preferred embodiment of my invention in the form of a complete fuel servicing and feeding system, the embodiment here shown having two engines and two tanks.

The several tanks shown, each has a set of associated devices for controlling fuel inflow or fuel outflow, and the several engines shown each has its associated devices for pumping and controlling fluid flow to the engine. Part of these instrumentalities are of special construction and are shown in cross section and their operation described. Others are of standard construction and are shown in outline only. The booster pump, one of which is provided for each tank is a standard commercially available centrifugal booster pump while the remote controlled gate valves, several of which are required for each tank-and-engine unit, are also standard electrically operated gate valves which are commercially procurable from the manufacturer. The booster pump is motor driven, but when not being driven by its motor will permit fuel to be drawn through it by an outside flow creating source. The associated equipment of the engines and that of the tanks is all remotely controlled by means of instrumentalities conveniently arranged on a centrally located switchboard.

A pistol-grip nozzle, which may be employed in conjunction with the present fuel servicing and feeding system is shown, described and claimed in my copending application Serial No. 65,951 filed December 17, 1948, now Patent No. 2,580,466, issued January 1, 1952.

Referring to the drawings and more particularly to Fig. 10, the skin 10 of an aircraft at a convenient location has been provided with an opening 12 into which is fitted and fastened a single fuel intake fitting through which the fuel tanks may be refueled. The fuel intake fitting assembly is herein broadly designated by the numeral 14.

The fuel intake fitting 14 comprises a flanged saucer like member 16 concentrically positioned with respect to the opening 12 and fastened therein by any suitable means (none shown). The inner periphery of the member 16 is slotted to receive the attaching hooks 17 of a servicing nozzle 18 which may preferably although not necessarily, be of the pistol-grip type, supra.

A flanged cup 20 concentrically surrounds the saucer-like member 16 and is also concentrically fastened with respect to the opening 12. A hollow casting 22 is fastened by screws 24 to the inner end of the flanged cup 20. Two resilient washers 26 with a metal ring 28 of T shaped cross section therebetween are clamped between the hollow casting 22 and the end of the flanged cup 20.

The other side of the hollow casting 22 is secured to a specially constructed joint 30 of a manifold 32 by screws 34, a gasket 36 being interposed between the hollow casting and the manifold joint 30, the gasket 36 serving also as a seat for a valve head 38. A hub 40 is an integral part of the hollow casting 22 and is supported on arms 42 one of which is drilled as at 44 for venting the hollow casting to the atmosphere when the nozzle, supra, is withdrawn.

Within the hollow casting 22 is a valve head 46 which normally is seated on one of the resilient washers 26. Two axially parallel bolts 48 are slidable through openings in the hub 40 but are fixed against axial movement with respect to the valve head 38 by reason of the heads of the bolts 48 being clamped between the valve head 38 and a washer 50 by the small bolt 52.

At the threaded ends, each of the bolts 48 has a nut 54 and a jam nut 56. Two flanged cups 58 and 60 have their flanges provided with holes within which the bolts 48 are slidable. A small stud 62 is fastened at the inner end by a pin 64 to the valve head 46, the outer end of the stud being welded to the flanged cup 60 thereby securing the cup to the valve head. The other flanged cup 58 is held against the flanged cup 60 by a relatively heavy coil spring 64. The bottom of the flanged cup 58 has an opening to slidably receive the small valve member 66, the small valve member having an enlarged portion which limits its axial movement in the cup 58. A light spring 68 urges the small valve member 66 toward its seat 70 which is in communication with the vent opening 44. A small conduit 45 may preferably be provided to continue the vent to and into the top of one of the tanks 80 (see Fig. 1). A pipe connection 47 is provided for pressure operation of an electric signal switch 49 (see Fig. 1) which indicates when the pressure in the fuel intake is at the proper value. The fuel intake fitting above described constitutes the attaching means for the pistol-grip nozzle, supra or other suitable nozzle, and the means for automatically shutting off the manifold against return flow when the nozzle is removed.

In a multiple engine and multiple tank system either as shown in the preferred embodiment Fig. 1 or in any of the modifications, there must be provided for each tank, a centrifugal booster pump, a refueling passageway from the manifold to each tank, a fuel feeding main conduit for moderate altitudes extending from the manifold through the engine pump to each engine, with a branch passageway from the tank through the booster pump when it is not being driven by its motor, and through piping into the main conduit a fuel feeding passageway for high altitudes extending from the booster pump and through the same branch passageway but with the booster pump being driven, and through the main conduit and the engine pump to each engine, and a fuel transfer passageway extending from the booster pump back to the manifold, with instrumentalities for controlling the flow, some by manual operation of switch board controls, some hydraulically by fluid pressure and some float-controlled by fuel level, signal means being included for indicating when the several controls are functioning.

Referring more particularly to Fig. 1, the refueling passageway extends from the manifold 32 through two switchboard controlled electrically operated gate valves 72 and 72a, through pipe 73, through a flow control valve 74, pipe 76 and fuel level control valve 78 into the tank 80. A pressure control valve 82 cooperates with the flow control valve 74 and with the fuel level control valve 78 to assist in causing them to become operative; a flow level control valve 86 releases the hydraulic lock 87 before the fuel level control valve 78 may become fully operative; and a pressure actuated signal switch 88 is provided to indicate the booster pump pressure.

The fuel level control valve 78, the hydraulic lock 87 and the float-operated valve 86 constitute the primary shut-off means for arresting fuel inflow into the tank at a predetermined level, while the flow control valve 74 serves as a secondary shut-off means for the same purpose should the primary shut-off means fail to function.

The fuel feeding passageway for moderate altitudes extends from the manifold 32 through the electrically operated gate valve 72, pipe 90, electrically operated gate valve 72b, fuel strainer 92, engine pump 94 to the engine 96 with a branch passageway extending from the tank 80, through the booster pump 98 when it is not being driven by its motor, through pipe 100, check valve 102, gate valve 72a, into the main conduit 90. The fuel feeding passageway for high altitudes extends from the tank 80 through the booster pump 98 when it is being driven by its motor through pipe 100, check valve 102, pipe 104, gate valve 72a, pipe 90, gate valve 72b, strainer 92, engine pump 94 to the engine 96, or, if either pump fails to function this same valving will permit the other pump to temporarily function for both.

The fuel transfer passageway extends from the discharge side of the booster pump 98 through pipe 100, check valve 102, pipe 104, gate valve 72a and back to the manifold through gate valve 72. A short pipe 99 connects the check valve 102 to the inlet side of the pressure control valve 82. Another short pipe 101 connects the outlet side of the pressure control valve 82 to the long pipe 84. Another short pipe 103 connects the pipe 101 to the flow control valve 74. Still another short pipe 105 connects the booster pump outlet to the upper connection of the pressure control valve 82 and another short pipe 107 connects the booster pump outlet to the pressure-actuated signal switch 88.

The electrically operated gate valves 72, 72a and 72b, the booster pump 98, the signal switch 88 and the check valve 102 are all purchasable articles of manufacture and are therefore not shown or described in detail.

The fuel level control valve 78 with its cooperating flow level control valve 86, the flow control valve 74, and the pressure control valve 82 are shown in section and are described in detail. Conduits 106, 108, 110, 112 and 114 extend from the electrically operated instruments, i. e., the booster pump 98, the signal switch 88, the gate valve 72a, the gate valve 72, and the gate valve 72b, respectively, through the relay box 116 and junction box 118 to the switch panel 120.

The fuel level control valve 78 of Fig. 1 is shown in detail in Fig. 8 and comprises a lower housing part 122 and an upper housing part 124 clamped together by any suitable means (none shown) with the outer edge of a diaphragm 126 clamped between the two housing parts.

The fuel inlet pipe 76 delivers fuel into the chamber 128 within the hub 130 which carries the seat 132 of the main valve 77. The central portion of the flexible diaphragm 126 lies between metal washers 134 and 136. The flexible disc 138 which engages the valve seat 132 lies between the metal washers 136 and 140. Parts 134, 126, 136, 138 and 140 are all provided with a central opening which fits over the cup 142. Cup 142 has a slight shoulder near the lower end and is externally threaded near the top for the nut 144 by which the parts 134, 126, 136, 138 and 140 are clamped together.

Surrounding the hub 130 is an annular chamber 146 with circumferentially spaced windows 148, whereby, when the disc 138 is raised off the seat 132, fuel may flow from the chamber 128 over the seat 132 into the annular space 146 and out the windows 148 into the fuel tank 80.

Movable vertically in the cup 142 is an inverted stepped cup 150. A coil spring 149 rests on a shoulder of the cup 150 forcing it to the bottom of cup 142 and thereby holding the main valve disc 138 lightly on the seat 132. A small check valve broadly designated by the numeral 151 consists of a disc 152 which lies over a small hole 154 in the bottom of the cup 142 and is held thereon by a light spring 156. The disc 152 is limited in upward movement by engagement with the shoulder in the inverted cup 150.

A pressure chamber 158 is formed by recessing the bottom of the upper housing part 124, whereby, whenever the check valve disc 152 is raised by the pressure in chamber 128 until the pressure equalizes as between the chambers 128 and 158, the main valve disc 138 will be held tightly on the seat 132 by reason of the fact that, although the p. s. i. in both chambers is the same, the area of the chamber 158 greatly exceeds the area of the chamber 128.

Hingedly supported in the upper housing part 124 is a float comprising a cork block 160, reinforced by metal plates 162 and 164 held to the block by bolts 166 and 168. Plate 164 has the edges turned downward to provide bearing for the hinge pin 170.

Tightly fixed in the upper housing part 124 is a bleed valve 171 having a casing 172 containing a needle-valve stem 174 which is guided at the upper end in the casing. An adjusting screw 176 passes through a hole in the metal plate 164 into the top of the valve stem 174. A lock nut 178 on the screw 176 maintains proper adjustment between the float and the needle valve. The flow capacity of the needle valve should be considerably in excess of the flow capacity of the check valve opening 154. Dropping of the float block 160 from the position shown opens the needle valve 174 whereby fuel under pressure may escape from the chamber 158 faster than it may enter through the check valve opening 154, whereby the pressure in the chamber 158 drops, and fuel supplied by the pipe 76 will pass over the valve seat 132 into the annular space 146, through the windows 148 into the tank 80, Fig. 1.

The hydraulic lock which has been broadly designated by the numeral 87 consists of a casing 182 supported on the upper housing part 124 and having a cover 184 fastened to the casing by means not shown with a gasket 186 and the flange 188 of a bellows 190 held between the casing and cover. A rod 192 is fast to the inside of the lower closed end of the bellows 190 and has bearing in the cover 184 for vertical sliding movement. A flexible disc 194 is fast on the outside of the lower closed end of the bellows. A coil spring 196 urges axial extension of the bellows. An arm 198 carries an adjusting screw 200 the end of which rests on the outer end of the float reinforcing plate 164, whereby, when the bellows is fully extended and the flexible disc 194 seated, the float will be held locked in the up position as shown. A lock nut 202 maintains the adjustment of the screw 200.

A passageway 204 connects the space 206 around the outside of the bellows 190 by way of the pipe 84 to the pressure control valve 82 or by way of the pipe 208 to the inlet of the flow level control valve 86.

The flow level control valve 86 (see Fig. 8a), comprises a body 210 and cover 212 clamped together on a gasket 214. A float 216 is carried on an arm 218 pivoted at 220 on a bracket 222. A sleeve 217 fixed in the cover 212 provides sliding bearing for the valve stem 219. At the lower end of the valve stem 219 there is a valve head 221. When the tank 80, Fig. 1, is less than full, and the float 216 consequently lowered from the position shown, the valve head assumes its raised position wherein it seats and closes the opening 224 against further flow of fuel coming through the pipe 208, chamber 226 and opening 225.

The flow control valve 74 (see Fig. 6) comprises a housing preferably made in three sections 230, 232, and 234. A diaphragm 236 is clamped, pressure tight between housing sections 230 and 232 by screws 238 which may also clamp the housing sections 234 and 232 together thereby dividing the interior of the housing into three chambers 240, 242 and 244.

A valve broadly designated by the numeral 246 comprises a valve head 248 resting on a seat 250 formed in the middle housing section 232. A coil spring 252 has one end pressing on the bottom of a cup-shaped opening in the valve head 248, the other end reacting against a nut 254 which is adjustable to vary the strength of the spring by a screw 256. A cap 258 closes the opening through which the spring is assembled.

The central portion of the diaphragm 236 is clamped by a bolt 260 to the bottom of the valve head 248. A fuel inlet pipe 73 conveys fuel into the middle chamber 242 and a fuel discharge pipe 76 conveys fuel from the chamber 244. A short nipple 103 brings fuel under pressure from the pipe 101 (see Fig. 1), into the chamber 240.

The pressure control valve 82 (see Fig. 7) comprises a body 262 and lid 264 enclosing a bellows 266 with a small pipe 105 (see Fig. 1) communicating with the space 268 inside the bellows, and a small pipe 99 communicating with the space 270 outside the bellows through an opening 272. When the pressure in the pipe 99 and the space 270 exceeds that in the pipe 105 and the space 268 by a predetermined amount as it does during servicing when the booster pump is at rest, the disc 274 will be raised and fuel under pressure will flow in through the small pipe 99, through the opening 272, through opening 276 and out by way of the small pipe 101. When the pressure in the chambers 268 and 270 are equal as they are when the booster pump, which discharges into both pipes 99 and 105, is in operation, the coil spring 278 will in itself act to maintain the disc 274 on its seat and the transmission of pressure through the pipe 101 will discontinue, whereby, during booster pump operation, the valves 74 and 78 will remain closed to prevent the booster pump from pumping out of the tank back into the tank.

In the exemplification of the invention shown in Fig. 1, two engines 96 and two tanks 80 only are shown. It is to be understood, however, that in actual practice as many as six or more engines each with the fuel feeding accessories shown and described and a much greater number of tanks each with the fuel receiving accessories, may all be connected to the single manifold 32 either by prolonging the manifold or by providing taps thereinto as at 280 where a pipe 282 extends from the manifold for connection to a bomb bay tank (not shown).

In the drawing, Fig. 1, reference numerals are applied to one set of tank accessories and one set of engine accessories only, inasmuch as all units of an assembly are alike.

The operation of the fuel servicing and fuel feeding system shown assembled in Fig. 1, and in detail in Figs. 6, 7, 8, 8a and 10 may preferably be substantially as follows:

Let it be assumed that the tanks 80 are empty and are to be serviced. A nozzle 18 on the free end of a hose extending from a source of fuel supply is pushed into place in the fuel intake fitting 14 (see Fig. 10), and fastened with the nozzle hooks 17. The nozzle may preferably be of the pistol-grip type disclosed in my copending application Serial No. 65,951 filed December 17, 1948, now Patent No. 2,580,466, issued January 1, 1952. In cocking this nozzle for fuel flow therethrough, the nozzle valve 284, in opening, pushes the valve heads 46 and 38 of the fuel intake fitting off their seats 26 and 36 respectively, and presses the small vent valve 66 onto its seat 70. Fuel now flows into the manifold 32 and if the electrically operable gate valves 72 and 72a have been opened by means of the proper switches or the switchboard 120, fuel will flow through the pipe 73 into chamber 242 of the flow control valve 74 (see Fig. 6), where its flow will be momentarily arrested because there is not yet sufficient pressure in the chamber 240 to open the valve 246.

With flow arrested in the flow control valve 74, fuel will still flow through the pipe 104 until arrested by the check valve 102, whereupon it will flow through the pipe 99 and opening 272 of the pressure control valve 82 (see Fig. 7) to the space 270 around the bellows 266, and since there is not yet at this time an equal or greater pressure in the space 268 inside the bellows due to the fact that the booster pump is not now operating, the bellows will contract and open the passageway 276 to the pipe 101 from which it passes through the pipe 103 into the chamber 240 of the flow control valve 74 whereupon the valve 246 will open, and fuel under pressure will flow through the pipe 76 to the chamber 128 of the fuel level control valve 78 (see Fig. 8).

Now until such time as sufficient fuel under pressure flows through the small pipe 84 into the space 206 of the hydraulic lock 87, the float 160 will remain up and the main valve 77 therefore closed, and since the small float 216 of the flow level control valve 86 is now down, the bleed opening 224 will be closed. Fuel under pressure, therefore will quickly flow through the small pipe 84 to the hydraulic lock 87, out the pipe 208 until arrested by the closed bleed passageway 224 whereupon it flows into the space 206 of the hydraulic lock 87 and raises the arm 198 thereby lowering the float 160, thereby opening the needle valve 171, thereby lowering the pressure in chamber 158, thus allowing the main valve 77 to open freely until the predetermined fuel level reaches the small float 216 and raises it to the position shown in Fig. 8a, which opens the bleed opening 224, which allows the pressure in space 206 of the hydraulic lock 87 to drop, which lowers the arm 198, which raises the float 160, which closes the needle valve 171, which allows pressure to build up in chamber 158 and fully close the main valve 77 of the fuel level control valve 78. The fuel nozzle 18 may now be removed, whereupon all pressure within the system drops to zero, whereby the shut-off valve 74 is closed by the spring 252, and the float valve 78 is locked in the closed position, to remain so until unlocked by the next servicing operation, and it does not matter whether in the interim the booster pump is pumping or not, since in either case the pressures in pipes 99 and 105 are equal.

By opening the gate valves 72, 72a and 72b, fuel may be fed to an engine through its fuel feeding passageway by the engine pump 94 alone for flying at moderate altitudes, or, in case of engine pump failure, by the booster pump alone by closing the gate valve 72 and opening the gate valve 72a, or, if the altitude is considerable, by closing the gate valve 72 and operating the booster pump 98 in conjunction with the engine pump, or, the booster pump alone may be operated for transferring the fuel of a tank back into the manifold and through it into any other tank of the system by closing the gate valve 72b and openings 72 and 72a in both the tank being emptied and that into which the fuel is to be transferred.

It will be noted that, in feeding fuel either to an engine or back into the manifold by operating the booster pump, the pressure in the space 270 and the pressure in the space 268 (see the pressure control valve, Fig. 7) will be equal, i. e., will be the booster pump pressure, whereby the passageway through the pipe 99 to the pipe 101 will be closed, and since both the flow control valve 74 and the fuel level control valve 78 depend on the pressure received through the pipe 101 to keep them open, both valves 74 and 78 will close and prevent recirculation of fuel by the booster pump from the tank back into the tank.

In the modification shown in Fig. 2, the refueling passageway extends from the manifold 32, through the electrically operated gate valves 72 and 72a, pipe 75, through the flow control valve 74a, which, in this modification, is the primary shut-off means, and backward through pipes 104a and 100a, through the booster pump 98, i. e., in at the discharge side and into the tank 80 through the suction side. The booster pump is of the centrifugal type and at this time will not be rotating.

The fuel feeding passageway for moderate altitudes extends through substantially the same course as is seen in Fig. 1, i. e., through electrically operated gate valve 72, pipe 90, gate valve 72b, strainer 92 and engine pump 94 (not shown in Fig. 2, see Fig. 1), to the engine 96, the interior of the tank 80 being in communication with the pipe 90 through the booster pump, now not under rotation, and through pipe 100a, 104a, valve 74a, pipe 75 and valve 72a, whereby the fuel level in tank 80 and pipe 90 is equalized. The fuel feeding pasageway for high altitudes extends from the discharge side of the booster pump 98 now being motor driven, through pipe 100a, pipe 104a, backward through flow control valve 74a, through pipe 75, through gate valve 72a, pipe 90, gate valve 72b, strainer 92, engine pump 94 to the engine 96, and in case of engine pump failure, the booster pump may perform the function of both pumps but preferably at a lesser altitude.

The fuel transfer passageway extends from the discharge side of the booster pump 98 when under rotation, through pipe 100a, 104a, backward through flow control valve 74a, pipe 75, gate valves 72a and 72 to the manifold 32, from which it may be allowed to flow into an empty tank by opening the gate valves 72 and 72a and closing the gate valve 72b on both the tank being emptied and the tank being filled.

A small pipe 99a connects the middle chamber 242 of the flow control valve 74a (see Fig. 6a) to the inflow side of the pressure control valve 82. Another short pipe 101a connects the outflow side of the pressure control valve 82 to the long pipe 84a which extends to the input side of the flow level control valve 86a. Another long pipe 89 connects the discharge side of the flow level control valve 86a to the chamber 240 of the flow control valve 74a. A short pipe 105a connects the space 268 within the bellows 266 of the pressure control valve 82, Fig. 7, to the discharge side of the booster pump 98. A pressure operated signal switch 88 is connected by a short pipe 91 to the discharge side of the booster pump.

The flow level control valve 86a (see Fig. 8b) is particularly adapted for use in the modification Fig. 2 and differs from the flow level control valve 86, used in Fig. 1 in that the valve 86 is open when the float 216 is in the raised position while the valve 86a is closed when the float 216 is in the raised position.

The flow level control valve 86a, Fig. 8b, comprises a body 304 and cover 306 clamped together on a gasket 308. A float 216 is carried on an arm 218 pivoted at 220 on a bracket 222. A sleeve 310 fixed in the cover 306 provides sliding bearing for the valve stem 312. At the lower end of the valve stem 312 there is a needle point 314 which, when a tank 80 is less than full and the float 216 consequently lowered from the position shown, assumes its raised position wherein it unseats and opens a passageway from the pipe 84a to the pipe 89.

The flow control valve 74a (see Fig. 6a) comprises a housing preferably made in three sections 230, 232 and 234. A diaphragm 236 is clamped pressure tight between housing sections 230 and 232 by means (not shown) the same or similar means being employed to clamp the housing sections 234 and 232 together thereby dividing the interior of the housing into three chambers 240, 242 and 244.

A valve 316 comprises a head 318 resting on a seat 320 in the middle housing part 232. A spring 322 has one end pressing against the bottom of a cup-shaped opening 324 in the head 318 and the other end reacting against a nut 254 which is adjustable to vary the strength of the spring by a screw 256.

A cap 258 closes the opening through which the spring is assembled. A relatively light spring 326 holds a plate 328 over holes 330 whereby fuel may be made to flow in a reverse direction through the valve 316.

The central portion of the diaphragm 236 is clamped between washers 332 and 334 and to the bottom of valve head 318 by a bolt 336. Bolt 336 has a hollow head 338 within which a needle valve 340 has axial movement which is limited by a turned-in shoulder 342 in the head. A small coil spring 344 keeps the needle valve 340 in the extended position whereby the needle valve will reach its seat before the larger valve head 318 will reach its seat 320 when the spring 322 moves the valve parts to the closed position.

The fuel inlet pipe 75 extends into the middle housing section 242 and the fuel outlet pipe 104a extends from the lower housing section 244. An opening 350 in the middle housing section 242 is provided for connecting the small pipe 99a, and an opening 352 in the upper housing section 230 is provided for connecting the long pipe 89, the opening 352 being controlled by the needle valve 340.

A quantity gauge 284 (see Fig. 9) comprises a casing 286 having a shaft 288 slidable therein. Shaft 288 carries a coarse pitch thread 287 whereby vertical movement of the shaft rotates the potentiometer arm 289 which is in contact with the resistance 291. Arm 289 is rotated by its internally threaded hub 285 which lies between two hubs 283 carried in the casing 286. A bracket 294 extends diagonally downward from the casing 286 and, at the lower end, an arm 296 is hinged thereto by a pin 298. A float 300 on the end of the arm 296 operates a rod 302 which in turn actuates the shaft 288 to engage contacts 290 and 292. At a predetermined fuel level, somewhat above the level at which the float 216 closes the valve 86a, the float 300 engages the contacts 290 and 292 completing a circuit through the winding of the electrically operated gate valve 72a which closes the valve automatically thus providing a secondary shut-off means in case the primary shut-off means 74a fails to function. Appropriate conductors extend from the electrically operated instruments through the relay box 116 and junction box 118 to the switch panel 120 as stated with respect to Fig. 1.

The operation of the modification shown in Fig. 2 may preferably be substantially as follows:

Let it be assumed that the fuel is under pressure and is flowing into the manifold as explained with respect to the exemplification Fig. 1, and that the electrically operated gate valves 72 and 72a are open, and that the tank 80 is empty whereby the float 216, instead of being in the up position shown, is in the lowered position in which position the valve head 314 is off its seat and the valve 86a (see Fig. 8b) consequently open. Fuel will now flow through the gate valves 72 and 72a through pipe 75 into the middle chamber 242 of the flow control valve 74a (see Fig. 6a) where it is momentarily arrested because the valve 316 is closed both by the spring 322 and also because the area of the diaphragm 236 which is exposed to the fluid pressure exceeds the area of the valve head 318 which is exposed to the same pressure.

Fuel, however, flows out of the middle chamber 242 through small pipe 99a, and, when the incoming pressure reaches a predetermined value, through the pressure control valve 82, pipe 101a, pipe 84a, flow level control valve 86a, pipe 89, and by pushing the needle valve 340 off its seat it flows into chamber 240 of the flow control valve 74a, where it acts on the diaphragm 236 and opens the valve 316, allowing fuel to pass freely through the primary shut-off means, i. e., the flow control valve 74a, and through the pipes 104a and 100a and backward through the booster pump 98, i. e., in at the pump discharge opening and into the tank through the pump suction opening, the pump being at this time nonrotative, the entire tank being filled in this manner and the nozzle then disengaged.

By opening the gate valve 72, 72a and 72b, fuel may be fed to an engine through its fuel feeding passageway by the engine pump 94 alone when flying at a moderate altitude.

If the altitude is considerable, the gate valve 72 may preferably be closed and 72a and 72b opened and the booster pump started so that both pumps will be connected in series to operate together, and with this setup, if one pump fails to function the other will pump through the same passageway alone. The booster pump may also be employed for pumping fuel from the tank backwardly through the flow control valve 74a and gate valve 72a through pipe 90 to the engine or through gate valve 72 back to the manifold and through it to some other tank.

As in the exemplification shown in Fig. 1, the booster pump pressure acting through both pipes 105a and 99a will be the same in the space 270 as it is in the space 268 (see Fig. 7) and the pressure control valve 82 will be closed, whereby no fuel pumped by the booster pump 98 will be supplied under pressure to the small pipes 85a, 89 and the chamber 240 of flow control valve 74a, such fuel being pumped through pipes 100a, 104a and backwardly through the small holes 330 in the flow control valve 74a by raising the plate 328 against the resistance of the light spring 326, thence through gate valve 72a either to an engine or back to the manifold.

Referring to the modification shown in Fig. 3, the refueling passageway extends from the manifold 32 through the electrically operated gate valves 72, 72a and 72c, pipe 354, through a fuel level control valve 356 which, in this case, is the secondary shut-off means, into the tank 80. The fuel level control valve 356 is substantially like that used in the modification shown herein in Fig. 1, except that the hydraulic lock 87, and the pipe 84 leading to it, are omitted. Substantially the same valve is shown, described and claimed in my copending application Serial No. 645,694, filed February 5, 1946, now Patent No. 2,491,521, issued December 20, 1949. The quantity guage 284 is like that shown and described with respect to the modification Fig. 2. In the modification Fig. 3 the electrical connection made by the gauge 284 completes a circuit through the electrically operable gate valve 72c which constitutes the primary shut-off means. The booster pump 98, signal switch 88, check valve 102 and electrically operable gate valves 72, etc. are standard purchasable articles of manufacture.

The modification Fig. 3 operates as follows:

With gate valves 72, 72a and 72c opened, fuel flows from the manifold through the three gate valves, through pipe 354 to and through the fuel level control valve 356 which, when the float is down, is open. The level at which valve 356 operates is above the level at which the float 300 operates the switch 284, whereby the switch 284 becomes the primary shut-off means. If, however, for any reason the float actuated switch 284 fails to function and shut off the electrically operated valve 72c, the float valve 356, at a slightly higher level, will act as a secondary shut-off means to close against further fuel entry into the tank 80.

By opening valves 72 and 72b and closing valve 72a, fuel may be delivered to the engine 96 by the engine pump 94 alone for flying at moderate altitude.

By closing valves 72 and 72c and opening valves 72a and 72b and starting the booster pump 98, both pumps will cooperate in delivering fuel to the engine, or, in this case, if one pump is damaged, the other will function for both.

By closing valves 72b and 72c and opening valves 72 and 72a and operating the booster pump 98, fuel will be returned from the tank 80 to the manifold 32 thence into any of the tanks which are opened to receive it.

Closing the valve 72c will prevent recirculation of the booster pump output from the tank back into the tank via the pipe 354 and float valve 356.

The check valve 102 will prevent fuel from the manifold 32 flowing into the tank 80 backwardly through the booster pump 98 instead of through the fuel level control valve 356 as is desired.

With reference to the modification shown in Fig. 4, the refueling passageway extends from the manifold 32 through the electrically operated gate valves 72 and 72a, pipes 358 and 360, into the check valve housing 362, into the special fuel control valve 364, and through it into the tank 80.

The special fuel control valve 364 shown in detail in Fig. 5, is the primary shut-off means in the modification Fig. 4 and comprises a hollow body 366 a mid section 368 and a cover 370, the body 366 and mid section 368 being secured together with a diaphragm 372 clamped therebetween by bolts 374, and the mid section 368 and the cover 370 being secured together with a gasket 376 clamped therebetween by screws 378, thereby dividing the space within the valve into a lower chamber 380, a middle chamber 382 and an upper chamber 384.

The pipe 360, through the check valve housing 362, delivers fuel into the space 386 below the main valve seat washer 388. Seat washer 388, together with metal washers 390 and 392 and diaphragm 372 are clamped together between a flange 394 on the lower end of a cup 396 and a turned-over portion 398 on the upper end of the cup. The cup 396 has a small opening 400 in the bottom.

The flange 394 is notched as at 395 at circumferentially spaced intervals for the passage of fuel when the main valve is open. A circular row of holes 397 permits fuel to flow from the chamber 380 into the tank 80 when the main valve is open.

Movable vertically in the cup 396 is an inverted stepped cup 402. A coil spring 404 rests on a shoulder of the inverted cup 402 forcing it to the bottom of the cup 396 and thereby holding the main valve disc 388 lightly on its seat 406. A small check valve 408 consists of a disc 410 which lies over the small opening 400 and is held thereon by a light spring 412. The check valve disc 410 is limited in upward movement by engagement with the shoulder in the inverted cup 402.

A relief valve 414 consists of a seat member 416 fixed in the wall of the mid section 368, and a valve stem 418 supported on the end wall inside a bellows 420 which is centrally positioned in the upper chamber 384, the lower end of the bellows being closed by joining it to the wall of the mid section 368. When pressure sufficient to shorten the bellows is let in through the pipe 422 the head of the valve stem 418 will be raised off its seat 424. A relief opening 426 connects the inside of the bellows 420 back to the tank 80.

The check valve 428 comprises a valve head 430 seated in an opening 432 in the check valve housing 362. The stem 434 of the valve has sliding bearing in a bearing member 436 threadedly supported in the wall of the housing 362. A spring 438 holds the valve head 430 on its seat in the opening 432. In the assembly Fig. 4, the opening 432 will have direct communication with the discharge side of the booster pump 98.

The discharge side of the booster pump is also connected by piping 440 to the signal switch 88 and to the upper connection of the pressure control valve 82 these two instruments being the same in construction and operation as shown in the preferred embodiment Fig. 1.

Inlet and discharge pipes 99 and 101 (see Fig. 7) are replaced respectively with pipes 442 and 444 (see Fig. 4) for fuel flow at the preselected pressure. A long pipe 89 connects the pipe 444 to the flow level control valve 86a (see Fig. 8b).

The fuel level control valve 86a, quantity gauge 284, which acts also as a secondary shut-off means, the pressure control valve 82, signal switch 88, booster pump 98 and gate valves 72 and 72a are all like those shown and described with respect to Fig. 2.

The operation of the modification of Fig. 4, may preferably be substantially as follows:

Assume the tank 80 to be empty and the float 216 of the flow level control valve 86a, shown in detail in Fig. 8b, to be in its down position, i. e., with the needle valve 314 open. By opening gate valves 72 and 72a and closing 72b, fuel may be pumped into the tanks from the manifold 32, gate valves 72 and 72a, pipes 358 and 360, check valve housing 362 into the chamber 386, but the main valve disc 388 is now being held on its seat by the pressure in the chamber 382.

Fuel under pressure from the pipe 360 will now pass through the small pipe 442 (see Fig. 4), pressure control valve 82, pipes 444 and 89, through the flow level control valve 86a, pipe 422 into the space 384 around the bellows 420. The bellows will shorten because of the applied pressure and the valve head will be raised from its seat 424, whereby the pressure in the chamber 382 will be relieved through the relief valve 414 and relief opening 426.

Since the outflow capacity of the relief valve 414 exceeds the inflow capacity of the check valve 408, the pressure in the chamber 382 is relieved and the main valve disc 388 is raised off its seat 406 and fuel flows through the notches 395 and out the openings 397, which continues until the fuel has risen to the predetermined level at which the float 216 closes the float valve 86a, whereupon the relief valve 414 closes for lack of pressure in the chamber 384 and fuel under pressure, again entering through the check valve 408, builds up in the chamber 382 and presses the disc 388 on to the seat 406 thereby stopping further fuel entry into the tank 80. If, however, the special fuel control valve 364, for any reason, fails to shut off the incoming fuel at the desired level because of failure of the float valve 86a to function, the valve 284, operated by float 300 will act as a secondary shut-off means to shut off incoming fuel as explained with reference to the exemplifications Figs. 2 and 3.

For flying at moderate altitudes, the gate valve 72, 72a and 72b should be opened, thereby providing a fuel feeding passageway from the manifold 32, gate valve 72, pipe 90, gate valve 72b (see Fig. 1), strainer 92 and engine pump 94 to the engine 96, with a fuel level equalizing passageway extending from the tank 80 through the nonrotating booster pump, piping 360, 358, valve 72a to pipe 90.

For flying at high altitudes the booster pump should be started, the gate valves 72a and 72b should be opened and the gate valve 72 preferably closed, thereby providing a fuel feeding passageway from the booster pump 98 through the check valve opening 432, pipes 360 and 358, gate valve 72a, pipe 90, gate valve 72b, strainer 92, engine pump 94 to the engine 96. With this arrangement, if one of the pumps fails the other will carry on for both.

For transferring fuel from one tank to another, the booster pump should be started, the gate valves 72 and 72a opened and the gate valve 72b closed, thereby providing a passageway through the check valve opening 432, pipes 360 and 358, gate valve 72a and back to the manifold through gate valve 72 from whence it may be directed into any tank the gate valves 72 and 72a of which have been opened.

The electrical wiring system generally applicable to the various embodiments of the invention is disclosed in Fig. 11. As seen in this figure an electrical power source such as 500, being preferably a D. C. power supply such as a battery, has one terminal thereof grounded and the other terminal connected to a bus 501 which is split into parallel fed buses 502, one for each engine tank assembly, and illustrated for the type of system such as shown in Fig. 2 of the drawings. One of the buses 502 is adapted to feed through a signal light 503 and conductor 503a to the pressure operated diaphragm switch generally indicated by reference numeral 49 and from thence to ground. When the pressure at the fuel inlet fitting exceeds a predetermined value, for which the switch 49 is set, the switch closes the circuit through signal light 503 to indicate that the refuelling operation is completed. Each bus 502 also has connected therewith a branch circuit leading through the signal light 504 which is connected to ground through the pressure actuated switch 82 and is adapted to indicate failure of the pressure supply from a booster pump associated with a particular fuel tank and engine assembly.

Each bus 502 has connected in parallel therewith the series of switches 505 to 508, inclusive, which switches are adapted upon actuation thereof to conduct power to the various operating instrumentalities as will now be described. It will be noted that each bus and switch assembly is duplicated for each engine and tank assembly with which the aircraft is equipped; and for example, in a four-engine aircraft four such switch assemblies would be employed. Actuation of switch 505 into engagement with either of its associated contacts energizes conductors 114 to in turn drive a reversible motor associated with gate valve assembly 72b to move the valve to either the open or closed position to accordingly open or cut off the supply of fuel to a respective engine. Switch 506 in one of its operating positions conducts currently through a conductor 106 to cause the booster pump 98 associated with the respective tank to operate at a normal operating speed, while in the other position current is conducted through conductor 106a to cause the booster pump to be operated at a high or emergency speed in the event of any abnormal drop in pressure caused for example by failure of an engine pump.

Switch 507 is adapted to energize either of conductors 110 to cause the reversible motor associated with valve assembly 72a to operate to respectively open or close the valve and cut off or connect the tank outlet through the booster pump to the engine feed line. Operation of switch 508 in either direction supplies current to either of conductors 112 to cause the reversible motor associated with gate valve 72 to operate to move the valve to the open or closed position and to respectively open or cut off communication of a respective fuel tank system from the refuelling and fuel transfer manifold. In addition to actuation of gate valve 72a by control switch 507 this valve may also be independently energized by means of conductor 510 and the float actuated switch assembly 284 which is illustrated in Fig. 2. The system otherwise is generally applicable to the other embodiments of the invention.

It will be understood that the various wiring illustrated in Fig. 11 on the aircraft will actually be inclosed in conduits such as illustrated in Fig. 1 and the other figures of drawings wherein the respective conductors were not shown for purposes of simplicity.

Having shown and described a preferred embodiment of my invention with a number of modifications thereof, I claim:

1. In an aircraft fuel system, a fuel receiving and distributing manifold, a plurality of engines, a plurality of fuel tanks, a plurality of engine pumps, one for each engine arranged to pump fuel to said engines, a plurality of booster pumps, one for each tank, arranged to pump fuel from said tanks to said engines and to said manifold, a plurality of shut-off valves one primary and one secondary in series for each tank both arranged to stop fuel flow from said manifold into said tanks at a predetermined level, float controlled fluid pressure operated means for actuating said primary shut-off valves, float means operative at a higher predetermined fuel level for closing said secondary shut-off valves, a plurality of flow passageways connecting the manifold, the engine pumps, the booster pumps and the shut-off valves together, and selectively operable valves in said passageways for directing fuel flow from the manifold to the tanks through the shut-off valves, from the manifold to the engines through the engine pumps, from the tanks through the booster pumps and the engine pumps to the engines, and from the tanks to the manifold through the booster pumps.

2. In an aircraft fuel system, a manifold for receiving and distributing fuel under a predetermined pressure, an engine, an engine pump, a plurality of fuel tanks, a booster pump for each tank, a primary shut-off valve for each tank operative to be closed by application of a predetermined fluid pressure thereto, a shut-off-valve float associated with each primary shut-off valve operative in its raised position to apply said predetermined pressure to close said primary shut-off valve, a hydraulically openable lock operative in the absence of a given pressure applied thereto to hold said shut-off-valve float in its raised position, a relief valve pressure-joined to said hydraulic lock, a relief-valve float operative in its down position to close said relief valve to build up pressure in said hydraulic lock to release said shut-off-valve float to its lower position to open said primary shut-off valve, a secondary shut-off valve for each tank having means operative to be opened by the application of said predetermined pressure to direct incoming fuel into said tank through said primary shut-off valve, a pressure control valve operative to open at a predetermined pressure of the incoming fuel to deliver fuel to said hydraulic lock to unlock said hydraulic lock and effect opening of said primary shut-off valve and to direct incoming fuel to said secondary shut-off valve to open said secondary shut-off valve, said pressure control valve during servicing having one end connected to the incoming fuel and arranged for opening said pressure control valve and having both ends connected to the booster pump and arranged to keep the pressure control valve closed during booster pump operation, a plurality of interconnected passageways joining the manifold, the engine pump, the booster pumps, and the shut-off valves, and selectively operable valve means in said passageways for selectively directing fuel flow from the manifold to the tanks through the shut-off valves, from the manifold to the engine through the engine pump, from a selected tank via its booster pump and the engine pump to the engine, and from the tanks back to the manifold via the booster pumps.

3. In an aircraft fuel system, a fuel receiving and distributing manifold, a plurality of engines, a plurality of fuel tanks, a plurality of engine pumps, one for each engine, arranged to pump fuel to said engines, a plurality of booster pumps, one for each tank, arranged to pump fuel from said tanks, a plurality of primary and a plurality of secondary shut-off valves, all arranged to stop fuel flow into said tanks, fluid pressure operated means for opening said primary shut-off valves, electromagnetic means for closing said secondary shut-off valves, float means operative at a predetermined fuel level for cutting off the pressure from said fluid pressure operated means to close said primary shut-off valves, float means operative at a predetermined higher level for operating said electromagnetic means for closing said secondary shut-off valves, a plurality of passageways connecting the manifold, the engine pumps, the booster pumps and the shut-off valves, and selectively operable valves in said passageways for directing fluid flow from the manifold to the tanks through the shut-off valves, from the manifold to the engines through the engine pumps, from the tanks through the booster pumps and the engine pumps to the engines, and from the tanks to the manifold through the booster pumps.

4. In an aircraft fuel system, a fuel receiving and distributing manifold, a plurality of engines, a plurality of fuel tanks, a plurality of engine pumps, one for each engine, arranged to pump fuel to said engines, a plurality of booster pumps, one for each tank, arranged to pump fuel from said tanks, a plurality of primary and a plurality of secondary shut-off valves, all arranged to stop fuel flow into said tanks, float-controlled electromagnetic means operative at a predetermined fuel level for closing said primary shut-off valves, float-controlled fluid pressure operated means operative at a predetermined higher fuel level for closing said secondary shut-off valves, a plurality of passageways connecting the manifold, the engine pumps, the booster pumps and the shut-off valves, and selectively operable valves in said passageways for directing fluid flow from the manifold to the tanks through the shut-off valves, from the manifold to the engines through the engine pumps, from the tanks through the booster pumps and the engine pumps to the engines and from the tanks to the manifold through the booster pumps.

5. In an aircraft fuel system, a fuel receiving and distributing manifold, an engine, a plurality of fuel tanks, an engine pump arranged to pump fuel to said engine, a plurality of booster pumps arranged to pump fuel from said tanks, a primary and a secondary shut-off valve in series for each tank arranged to prevent fuel flow thereinto at predetermined levels, fluid pressure operated means for opening said primary shut-off valves, electromagnetic means for closing said secondary shut-off valves, float means operative in its down position for applying said fluid pressure operated means to open said primary shut-off valves, float means operative to its up position at a predetermined fuel level for operating said electromagnetic means for closing said secondary shut-off valves, a plurality of passageways connecting the manifold, the engine pump, the booster pump and the shut-off valves of a tank, and selectively operable valves in said passageways for directing fluid flow from the manifold through the secondary shut-off valve, then through the primary shut-off valve, then backward through the booster pump into the tank, from the manifold to the engines through the engine pumps, from the tanks through the booster pumps and the engine pumps to the engines, and from the tanks to the manifold through the booster pumps.

6. The device of claim 5 with a one-way bypass valve associated with the primary shut-off valve so arranged that fluid may be pumped by the booster pump from the tank back to the engine or back to the manifold when the primary shut-off valve is closed.

7. A combined fuel servicing and fuel feeding system for aircraft which comprises a fuel intake fitting adapted to be supported in the outer surface of the aircraft and adapted for quick connection with the servicing fitting of a fuel supply container, a manifold, a plurality of engines, an engine driven pump for each engine for pumping fuel toward said engine, a plurality of fuel tanks carried, a booster pump for each tank for pumping fuel out of said tank, a fuel supply passageway between said fuel intake fitting and said manifold, a refueling passageway between each tank and said manifold, a float-controlled valve means in each said refueling passageway for interrupting fuel flow into a tank at a predetermined level, a fuel return passageway connecting the discharge side of each booster pump to the manifold, two selectively operable valves in each said fuel return passageway and a fuel feeding passageway connecting the suction side of each engine driven pump to the fuel return passageway at a point between the two said selectively operable valves.

8. The structure defined in claim 7 with the addition of a pressure controlled valve interposed in the fuel servicing passageway operative to be opened by pressure built up in the fuel intake fitting.

9. A combined fuel feeding and fuel servicing system for aircraft which comprises a fuel intake fitting adapted to be supported in the skin of the aircraft and adapted for quick connection with the servicing fitting of a fuel supply container, a manifold, a passageway joining said fuel intake fitting to said manifold, a plurality of engines, a plurality of fuel tanks, a booster pump for each tank, a series of passageways associated with each tank interconnected to provide a flow path from the manifold to a tank for servicing said tank, from the manifold to an engine for feeding said engine, or from the discharge side of a booster pump into the fuel feeding passageway at a point between the manifold and the engine, a float-controlled valve means for each tank interposed in each servicing passageway, operative to close against further fuel entry when said tank is full to a predetermined level, and valve means for selectively directing the fuel flowing from the booster pump into the fuel feeding passageway in one direction to the engine or in the opposite direction to the manifold.

10. A multitank fuel system for multiengine aircraft comprising an individual fuel supply conduit for each engine, an engine driven pump in each engine supply conduit, valve means in each said conduit for cutting off the supply of fuel to each engine driven pump, an individual fuel supply system operatively associated with each supply conduit and including at least one tank, booster pump means for delivery of fuel from said tank under pressure to said engine supply conduit, a single refueling and transfer manifold, conduit means connecting each individual fuel supply system to said manifold, valve means for said conduit means and fuel level responsive means for controlling said valve means to cut off the refueling supply from said manifold when the respective individual fuel supply system is filled, a valve controlled refueling inlet for said manifold adapted to be connected to a pressure refueling supply conduit external of the aircraft, the valve in said inlet being opened by connection of said inlet to said refueling conduit and closed by disconnection of said refueling conduit from said inlet, and means for selectively opening the valve means in the conduit means connecting the individual supply systems to the manifold independent of the control of the fuel level responsive means, whereby said manifold serves as a means for filling all of the fuel tanks to a predetermined level when said manifold inlet is connected to the refueling pressure supply, said manifold serving as a transfer conduit to transfer fuel from one individual supply system to a selected one or more of the remaining supply systems by operating the booster pump in the supply system whose fuel is to be transferred and shutting down the booster pumps in the supply systems to receive the fuel, with each of said latter systems being placed in flow communication with the manifold and said manifold serving, when all of the individual fuel supply systems are connected thereto, to form an equalizing connection for simultaneous consumption of fuel from all supply tanks.

11. A combined fuel servicing, feeding and transfer system for aircraft, which comprises, in combination, a plurality of engines, a plurality of engine driven pumps arranged to pump fuel to said engines, a plurality of fuel tanks, a plurality of booster pumps within said tanks arranged to pump fuel out of said tanks, a pressure-openable shut-off valve in each tank, a float-closable shut-off valve in each tank in series with the pressure openable shut-off valve, a pressure-openable lock associated with said float-closable shut-off valve for holding said float-closable shut-off valve in the closed state, a manifold, a fuel intake fitting in said manifold adapted to receive fuel under pressure, passageways from said manifold to the suction side of each engine pump, passageways from said manifold to the discharge side of each booster pump, check valves in the last said passageways to arrest flow from said manifold to said booster pumps, spring-closed pressure control valves constructed to have a port open therethrough by the pressure of the incoming fuel, conduits extending from the pressure side of said check valves through the port of said pressure control valves to said pressure-openable shut-off valves to hold them open, and to said pressure-openable lock to release said float-closable shut-off valve to be opened to the incoming fuel, balancing means in said pressure control valve to which pressure may be applied to balance the pressure of the fuel passing through the said port, conduit means connecting the discharge side of the booster pumps to said balancing means, and control valves for directing fuel from the manifold into the tanks for servicing said tanks, from the manifold to the engine pumps for low altitude fuel feeding, from the booster pumps to the engine pumps for high altitude fuel feeding and from the booster pumps back to the manifold for fuel transferring.

12. A fuel system comprising an engine, a fuel pump for said engine, a plurality of fuel tanks, a manifold, conduit means connecting each of said fuel tanks and said fuel pump with said manifold, fuel inlet valve means for each of said fuel tanks closing in response to a predetermined fuel filling level in the associated fuel tank, a booster pump for each of said fuel tanks connected to pump fuel from its associated fuel tank, distributing valve means to selectively direct the fuel pumped from any selected one or more of said fuel tanks either to said fuel pump for the engine or to any other selected fuel tank or tanks, means to connect said manifold to a source of fuel supply, said distributing valve means being also operable to selectively direct fuel flow for simultaneous refueling of said fuel tanks through said manifold.

13. The fuel system described in claim 12 including means operatively associated with each inlet valve to hold the valve closed after the associated tank is filled to a predetermined filling level to prevent recirculation of fuel from any fuel tank, through its associated booster pump and back into the same tank through the associated fuel inlet valve.

14. In a fuel system for aircraft, a plurality of fuel tanks adapted to be mounted in the aircraft, a fuel inlet conduit for each respective tank, fuel level responsive valve means in each inlet conduit for cutting off inlet of fuel when the associated tank is filled, a manifold adapted to be positioned in the aircraft, means on said manifold for releasably connecting the same to a refueling source exterior of the aircraft for simultaneous refueling of the tanks, a second conduit associated with each respective tank for withdrawal from or transfer of fuel to the associated tank, valve means including means for connecting each inlet conduit to said manifold for tank refueling and means for optionally connecting said second conduits to said manifold and pumping means adapted to be positioned in said aircraft for transferring fuel from one connected tank to another through said manifold.

15. Fuel transferring apparatus comprising a fuel intake fitting, a fuel tank, conduit means connecting said fitting and said tank, an automatic shut-off valve in said conduit means, liquid level responsive means in said tank operable in one condition to cause the closing of and prevent the opening of said shut-off valve and in another condition to render said shut-off valve openable in response to the introduction of fuel under pressure thereagainst from said manifold, locking means associated with said liquid level responsive means to lock said shut-off valve in closed position after it has been closed automatically through the action of said liquid level responsive means and means responsive only to a refueling condition automatically unlocking said locking means.

16. Fuel supply and transferring apparatus comprising a plurality of fuel tanks, an engine, booster pump and fuel supply cut-off valve means associated with each tank, a manifold, conduit means connecting said manifold to each of said engine, booster pumps and cut-off valves, said conduit means also connecting each booster pump and each cut-off valve with its associated fuel tank, gate valves in said conduit means whereby said booster pumps may be used selectively to supply fuel under pressure from each of said tanks either to said engine or to said manifold for transfer of fuel to another of said tanks, liquid level responsive means for each of said shut-off valves operable in one condition to cause the closing of and to prevent the opening of its associated shut-off valve and in the other condition to render said shut-off valve capable of being opened in response to the introduction of fuel thereagainst from said manifold, locking means associated with each of said liquid level responsive means to lock the associated liquid level responsive means in the condition in which it prevents opening of its associated shut-off valve after said valve has been closed through the action of said liquid level responsive means and pressure responsive means unlocking said locking means when said tanks are being refueled.

17. The device described in claim 16 including means to prevent unlocking of any one of said locking means whenever the booster pump of an associated fuel tank is operating whereby to prevent recirculation of fuel back into the associated tank.

18. Fuel transferring apparatus comprising a fuel intake fitting, a plurality of fuel tanks, a manifold, first conduit means connecting said fuel intake fitting with said manifold and said manifold with each of said fuel tanks, a booster pump associated with each of said tanks, second conduit means connecting each of said booster pumps with its associated fuel tank and said manifold, an automatic shut-off valve for each of said tanks in said second conduit means, liquid level responsive means associated with each of said tanks operable in one condition to cause the closing of and prevent the opening of its associated shut-off valve and in the other condition to render said shut-off valve capable of being opened in response to the introduction of fuel under pressure thereagainst from said manifold, locking means associated with each of said liquid level responsive means to lock the associated liquid level responsive means in the condition in which it prevents opening of its associated shut-off valve after said valve has been closed through the action of said liquid level responsive means and pressure responsive means associated with each tank unlocking said locking means when said tank is being refueled.

19. Fuel supply and transferring apparatus comprising a plurality of fuel tanks, a plurality of engines, a booster pump and fuel supply cut-off valve associated with each tank, a manifold, conduit means connecting said manifold to each engine, booster pump and cut-off valve, said conduit means also connecting each booster pump and each cut-off valve with its associated fuel tank, gate valves in said conduit means whereby said booster pumps may be used selectively to supply fuel under pressure from each of said tanks either to its associated engine or to said manifold either for transfer of fuel to another of said tanks or fuel feed to another said engine, liquid level responsive means for each of said shut-off valves operable in one condition to cause the closing of and to prevent the opening of its associated shut-off valve and in the other condition to render said shut-off valve capable of being opened in response to the introduction of fuel thereagainst from said manifold, locking means associated with each of said liquid level responsive means to lock the associated liquid level responsive means in the condition in which it prevents opening of its associated shut-off valve after said valve has been closed through the action of said liquid level responsive means and pressure responsive means associated with each shut-off valve to unlock said locking means when said tanks are being refueled.

20. Fuel supply and transferring apparatus comprising a plurality of fuel tanks, a plurality of engines, a booster pump and fuel supply cut-off valve associated with each tank, a manifold, conduit means connecting said manifold to each engine, booster pump and cut-off valve, said conduit means also connecting each booster pump and each cut-off valve with its associated fuel tank, gate valves in said conduit means whereby said booster pumps may be used selectively to supply fuel under pressure from each of said tanks either to its associated engine or to said manifold for transfer of fuel to another of said tanks, liquid level responsive means for each of said shut-off valves operable in one condition to cause the closing of and prevent the opening of its associated shut-off valve and in the other condition to render said shut-off valve capable of being opened in response to the introduction of fuel thereagainst from said manifold, locking means associated with each of said liquid level responsive means to lock the associated liquid level responsive means in the condition in which it prevents opening of its associated shut-off valve after said valve has been closed through the action of said liquid level responsive means, and pressure responsive means associated with each shut-off valve to unlock said locking means only upon the introduction of fuel under pressure in said manifold for refilling the associated tank when the associated booster pump is not operating.

21. Fuel supply and transferring apparatus comprising a plurality of fuel tanks, a plurality of engines, a booster pump and fuel supply cut-off valve associated with each tank, a manifold, conduit means connecting said manifold to each of the engines, booster pumps and cut-off valves, said conduit means also connecting each booster pump and each cut-off valve with its associated fuel tank, gate valves in said conduit means whereby said booster pumps may be used selectively to supply fuel under pressure from each of said tanks either to its associated engine or to said manifold for transfer of fuel to another of said tanks, liquid level responsive means for each of said shut-off valves operable in one condition to cause the closing of and to prevent the opening of its associated shut-off valve and in the other condition to render said shut-off valve capable of being opened in response to the introduction of fuel thereagainst from said manifold, locking means associated with each of said liquid level responsive means to lock the associated liquid level responsive means in the condition in which it prevents opening of its associated shut-off valve after said valve has been closed through the action of said liquid level responsive means and pressure responsive means associated with each shut-off valve to unlock said locking means only upon the introduction of fuel under pressure in said manifold for refilling the associated tank.

22. Fuel transferring apparatus comprising a fuel intake fitting, a plurality of fuel tanks, a manifold, first conduit means connecting said fuel intake fitting with said manifold and said manifold with each of said fuel tanks, a booster pump associated with each of said tanks, second conduit means connecting each of said booster pumps with its associated fuel tank and said manifold, an automatic shut-off valve for each of said tanks in said first conduit means, liquid level responsive means associated with each of said tanks operable in one condition to cause the closing of and prevent the opening of its associated shut-off valve and in the other condition to render said shut-off valve capable of being opened in response to the introduction of fuel under pressure thereagainst from said manifold, locking means associated with each of said liquid level responsive means to lock the associated liquid level responsive means in the condition in which it prevents opening of its associated shut-off valve after said valve has been closed through the action of said liquid level responsive means and pressure responsive means associated with each tank to unlock said locking means only upon the introduction of fuel under pressure in said manifold for refilling the associated tank.

23. A multitank fuel system for multiengine aircraft comprising an individual fuel supply conduit for each engine, an engine pump in each engine supply conduit, valve means in each said engine supply conduit for cutting off the supply of fuel to each engine pump, an individual fuel supply system operatively associated with each engine supply conduit and including at least one tank booster pump means for delivery of fuel from said tank under pressure to said engine supply conduit; a single refueling and transfer manifold, refueling conduit means connecting each individual fuel supply system to said manifold, valve means for said refueling conduit means, and fuel level responsive means for controlling said valve means to cut off the refueling supply from said manifold when the respective individual fuel supply system is filled, a valve controlled refueling inlet for said refueling and transfer manifold and adapted to be connected to a refueling supply conduit means external of the aircraft, the inlet valve in said valve controlled refueling inlet being opened by connection of said valve controlled refueling inlet to said refueling supply conduit means and closed by disconnection of said refueling supply conduit means from said valve controlled refueling inlet, and means for selectively opening the valve means in the conduit means connecting the individual fuel supply systems to the manifold independent of the control of the fuel level responsive means whereby said refueling and transfer manifold serves as a means for filling all of the fuel tanks to a predetermined level when said valve controlled refueling inlet is connected to the refueling supply conduit means, said refueling and transfer manifold serving as a transfer conduit to transfer fuel from one individual fuel supply system to a selected one or more of the remaining supply systems by operation of the booster pump means in the supply system whose fuel is to be transferred and shutting down the booster pumps in the supply systems to receive the fuel with each of said latter systems being placed in flow communication with the refueling and transfer manifold and said manifold serving when all of the individual fuel supply systems are connected thereto to form an equalizing connection for simultaneous consumption of fuel from all supply tanks.

24. A combined fuel servicing and fuel feeding system for aircraft which comprises a fuel intake fitting adapted to be supported in the outer surface of the aircraft and adapted for quick connection with the servicing fitting of a fuel supply container, a manifold, a plurality of engines, an engine driven pump for each engine for pumping fuel toward said engine, a plurality of fuel tanks carried by said aircraft, a booster pump for each tank for pumping fuel out of said tank, a fuel supply passageway between said fuel intake fitting and said manifold, refueling passageways between said manifold and each tank, a float-controlled valve means in each said refueling passageway for interrupting fuel flow into a tank at a predetermined level, fuel return passageways connecting the discharge side of each booster pump to the manifold, two shut-off valves in each said fuel return passageway and fuel feeding passageways connecting the suction side of each engine driven pump to the fuel return passageway at a point between the two said shut-off valves.

References Cited in the file of this patent

UNITED STATES PATENTS

| | | |
|---|---|---|
| 1,393,861 | Weierhauser | Oct. 18, 1921 |
| 1,442,228 | La Salle | Jan. 16, 1923 |
| 1,673,348 | Czerner | June 12, 1928 |
| 1,776,877 | Yonkese | Sept. 30, 1930 |
| 2,145,602 | Kirgan | Jan. 31, 1939 |
| 2,149,298 | Kuzelka | Mar. 7, 1939 |
| 2,166,370 | Putnam | July 18, 1939 |
| 2,230,741 | Browning | Feb. 4, 1941 |
| 2,266,682 | Amiot | Dec. 16, 1941 |
| 2,278,002 | Thompson | Mar. 31, 1942 |
| 2,356,786 | Harman et al. | Aug. 29, 1944 |
| 2,440,262 | Grey et al. | Apr. 27, 1948 |
| 2,464,802 | Gavin et al. | Mar. 22, 1949 |
| 2,458,245 | Bordelon | Jan. 4, 1949 |